(12) United States Patent
Urabe

(10) Patent No.: US 7,166,054 B2
(45) Date of Patent: Jan. 23, 2007

(54) BICYCLE INTERNAL HUB TRANSMISSION WITH INCREASED BEARING SIZE

(75) Inventor: Hiroyuki Urabe, Shimonoseki (JP)

(73) Assignee: Shimano, Inc., Sakai (JP)

( * ) Notice: Subject to any disclaimer, the term of this patent is extended or adjusted under 35 U.S.C. 154(b) by 175 days.

(21) Appl. No.: 10/905,521

(22) Filed: Jan. 7, 2005

(65) Prior Publication Data

US 2005/0159263 A1    Jul. 21, 2005

(30) Foreign Application Priority Data

Jan. 16, 2004    (JP) ............................... 2004-009184

(51) Int. Cl.
  *B62M 11/16*    (2006.01)
(52) U.S. Cl. .................... 475/297; 301/110.5; 384/545
(58) Field of Classification Search ............. 301/110.6; 384/545; 74/594.1; 474/69, 72, 74
  See application file for complete search history.

(56) References Cited

U.S. PATENT DOCUMENTS

| | | | |
|---|---|---|---|
| 2,747,708 A | 5/1956 | Peterson | |
| 4,276,973 A * | 7/1981 | Fukui | ........................ 192/47 |
| 4,400,999 A | 8/1983 | Steuer | |
| 4,577,531 A | 3/1986 | Bergles | |
| 5,531,510 A * | 7/1996 | Yamane | .................... 301/110.5 |
| 6,382,381 B1 * | 5/2002 | Okajima et al. | .............. 192/64 |
| 7,083,542 B1 * | 8/2006 | Itou et al. | ................... 475/297 |

FOREIGN PATENT DOCUMENTS

| | | |
|---|---|---|
| JP | 47-4013 | 2/1972 |
| JP | 57-42792 | 9/1982 |

\* cited by examiner

*Primary Examiner*—Richard M. Lorence
*Assistant Examiner*—Edwin A. Young
(74) *Attorney, Agent, or Firm*—James A. Deland

(57) ABSTRACT

An internal hub transmission for a bicycle comprises a hub shaft structured to be mounted to a bicycle frame, a drive member, a driven member, and a planetary gear mechanism that communicates rotational force from the drive member to the driven member. A first bearing assembly comprises a separate first bearing cone mounted to the hub shaft, a first bearing cup, and a plurality of first bearing members disposed between the first bearing cone and the first bearing cup. A second bearing assembly comprises a separate second bearing cone mounted to the hub shaft axially spaced apart from the first bearing cone, a second bearing cup, and a plurality of second bearing members disposed between the second bearing cone and the second bearing cup. Third and fourth bearing assemblies rotatably support the drive member relative to the hub shaft.

23 Claims, 4 Drawing Sheets

BICYCLE INTERNAL HUB TRANSMISSION WITH INCREASED BEARING SIZE

BACKGROUND OF THE INVENTION

The present invention is directed to bicycles and, more particularly, to bicycle internal hub transmissions.

Japanese Utility Model Publication 57-42792 discloses an example of a two-speed internal hub transmissions installed in the rear wheel of a bicycle. Such internal hub transmissions are well known, and they usually comprise a hub shaft structured to be mounted to the rear end of the bicycle frame, a drive member rotatably mounted around the hub shaft, a driven member also rotatably mounted around the hub shaft axially in series with the drive member, and a transmission mechanism disposed inside the drive member. A sprocket can be mounted on an outer peripheral surface of the drive member so that the drive member can be rotated by means of a chain driven by the front pedals.

The transmission mechanism usually comprises a planetary gear mechanism that communicates rotational force from the drive member to the driven member. The planetary gear mechanism typically comprises a sun gear integrally formed with the hub shaft; a planet gear carrier rotatably supported relative to the hub shaft; a planet gear rotatably supported by the planet gear carrier, wherein the planet gear engages the sun gear; and a ring gear that engages the planet gear. A clutch mechanism is provided to select desired gear ratios of the transmission mechanism.

First and second axially spaced apart bearing assemblies usually are provided between the driven member and the hub shaft so that the driven member can rotate relative to the hub shaft. Each bearing assembly comprises a bearing cone, a bearing cup mounted to the driven member, and a plurality of ball bearings disposed between the bearing cone and the bearing cup. The second bearing cone usually is formed integrally with the hub shaft. Third and fourth bearing assemblies usually are provided so that the drive member can rotate relative to the hub shaft. The third bearing assembly usually is mounted between the drive member and the driven member, and the fourth bearing assembly usually is mounted between the drive member and the hub shaft.

Since the second bearing cone and the sun gear are formed integrally with the hub shaft, they must be made sufficiently small to allow the other components to be installed during assembly. For example, when the planet gear carrier is assembled to the hub shaft, it must be passed over the second bearing cone and placed over the sun gear. As a result, the second bearing cone and the sun gear each must have an outer diameter that is smaller than the inner diameter of the planet gear carrier. While a small diameter sun gear usually poses no problem, a small diameter second bearing cone reduces the number of ball bearings that can be mounted between the second bearing cone and the second bearing cup. As a result, when the bearings are subjected to large loads, excessive pressure is applied to the bearing cone and the bearing cup, thereby shortening the service life of the bearing assembly.

SUMMARY OF THE INVENTION

The present invention is directed to various features of a bicycle internal hub transmission. In one embodiment, an internal hub transmission for a bicycle comprises a hub shaft structured to be mounted to a bicycle frame, a drive member, a driven member, and a planetary gear mechanism that communicates rotational force from the drive member to the driven member. The planetary gear mechanism comprises a sun gear integrally formed with the hub shaft; a planet gear carrier rotatably supported relative to the hub shaft; a planet gear rotatably supported by the planet gear carrier, wherein the planet gear engages the sun gear; and a ring gear that engages the planet gear. A first bearing assembly comprises a separate first bearing cone mounted to the hub shaft, a first bearing cup, and a plurality of first bearing members disposed between the first bearing cone and the first bearing cup. A second bearing assembly comprises a separate second bearing cone mounted to the hub shaft axially spaced apart from the first bearing cone, a second bearing cup, and a plurality of second bearing members disposed between the second bearing cone and the second bearing cup. Third and fourth bearing assemblies rotatably support the drive member relative to the hub shaft.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
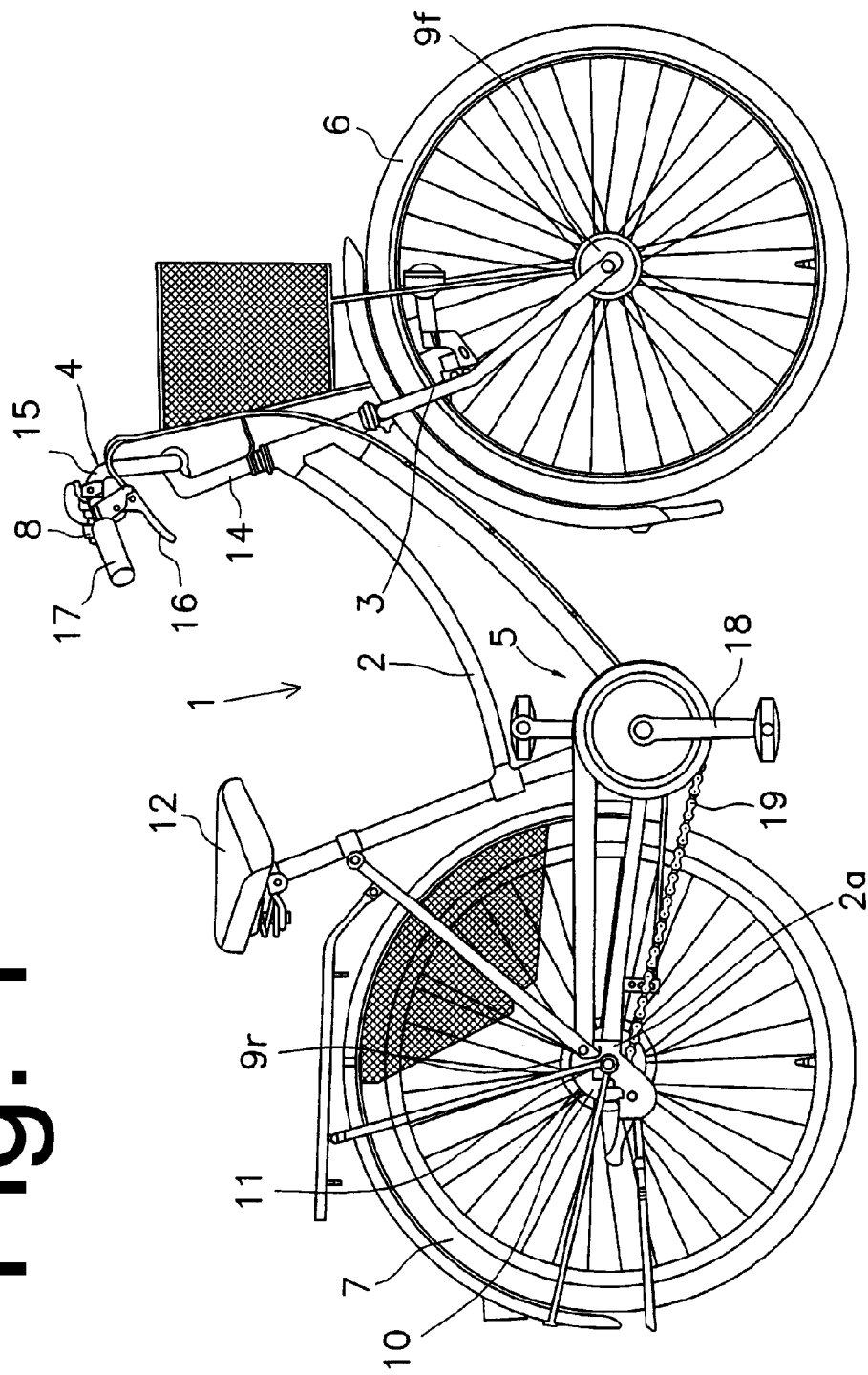
FIG. 1 is a side view of a particular embodiment of a bicycle.

FIG. 1 is a side view of a particular embodiment of a bicycle 1. Bicycle 1 comprises a frame 2, a front fork 3 rotatably mounted to frame 2, a handlebar assembly 4 mounted to the top of fork 3, a front wheel 6 rotatably attached to the bottom of fork 3, a rear wheel 7 including a two-speed internal hub transmission 10 rotatably attached to the rear of frame 2, braking equipment 9f and 9r that brake the respective front and rear wheels 6 and 7, a saddle 12 and a drive mechanism 5.

Handlebar assembly 4 comprises a handlebar stem 14 and a handlebar 15, wherein handlebar stem 14 is mounted to the top of front fork 3 and handlebar 15 is mounted to the top of handlebar stem 14. A brake lever 16 and grip 17 are installed on the right side of handlebar 15 to control rear braking equipment 9r. A similar brake lever and grip are installed on the left side of handlebar 15 to control front brake equipment 9f. A speed changing lever 8 also is installed on handlebar 15 to select a desired gear ratio of internal hub transmission 10.

Drive mechanism 5 comprises a pedal crank 18 mounted at the lower part of frame 2, a chain 19 mounted on pedal crank 18, and a sprocket 20 (FIG. 2) mounted to internal hub transmission 10. A bell crank 11 for operating internal hub transmission 10 is connected to speed changing lever 8 using a conventional Bowden type cable (not shown).

Figure 2:
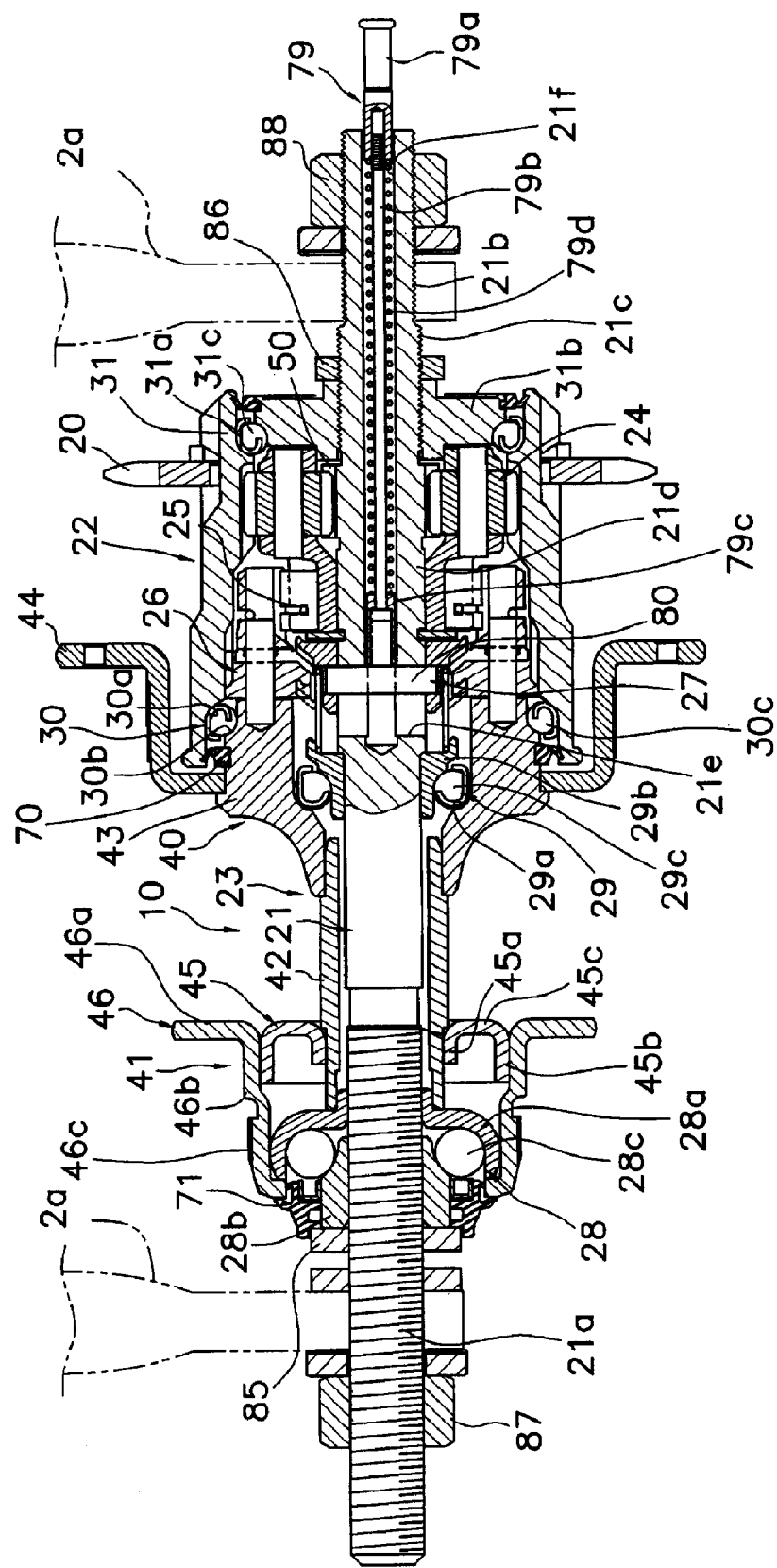
FIG. 2 is a cross sectional view of a particular embodiment of a hub transmission.

FIG. 2 is a cross sectional view of a particular embodiment of internal hub transmission 10. In this embodiment, internal hub transmission 10 is a two-speed transmission that provides reduced speed and direct-drive transmission paths. Internal hub transmission 10 comprises a hub shaft 21 with male threaded portions 21a and 21b that are mounted to rear dropouts 2a of frame 2 using nuts 87 and 88, a tubular driven member 23 rotatably mounted around hub shaft 21 through first and second bearing assemblies 28 and 29, a tubular drive member 22 rotatably mounted around hub shaft 21 through third and fourth bearing assemblies 30 and 31, and a planetary gear mechanism 24 that transmits rotational force from drive member 22 to driven member 23 through the two transmission paths. A first one-way clutch 25 transmits rotational force from planetary gear mechanism 24 to driven member 23 through the reduced speed transmission path, and a second one-way clutch 26 transmits rotational force from drive member 22 to driven member 23 through the direct drive transmission path. A clutch control mechanism 27 switches second one-way clutch 26 between operative and inoperative states.

Hub shaft 21 includes a male threaded portion 21c formed adjacent to male threaded portion 21b, wherein male threaded portion 21c has a larger diameter than male threaded portion 21b. Hub shaft also includes a larger diameter portion 21d, wherein a portion of larger diameter portion 21d adjacent to male threaded portion 21c forms a sun gear 50 of planetary gear mechanism 24. An oval-shaped groove 21e diametrically penetrates larger diameter portion 21d of hub shaft 21 to accommodate clutch control mechanism 27, and a push rod accommodating hole 21f is formed in the center of hub shaft 21 from groove 21e through the right end of hub shaft 21.

Driven member 23 comprises a right hub shell 40, a left hub shell 41, and a tubular connecting member 42 connected between right hub shell 40 and left hub shell 41. As shown more clearly in FIG. 3, right hub shell 40 comprises a generally tubular right shell main member 43 with a reduced diameter portion press fit to connecting member 42 and a larger diameter portion disposed inside the left end of drive member 22. A seal mounting groove 43b is provided for mounting a seal 70. An annular groove 43c is provided for mounting a lock ring 69 that retains a pivot shaft 68 fitted in a mounting opening 43e in an annular cutout 43d.

The larger diameter portion of right shell main member 43 also has a serrated hub flange mounting member 43a for nonrotatably mounting a right hub flange 44. Right hub flange 44 comprises an outer flange member 44a, an inner flange member 44b, and an intermediate tube member 44c disposed between outer flange member 44a and inner flange member 44b. The inner peripheral surface of inner flange member 44b is press fit to hub flange mounting member 43a. A plurality of spoke engaging holes 44d are circumferentially formed along outer flange member 44a to engage the spokes of rear wheel 7.

Left hub shell 41 comprises a left shell main member 45 and a left hub flange 46 that is press fit onto left shell main member 45. Left shell main member 45 is C-shaped in cross section, and it comprises a disk member 45c that is disposed between an inner small diameter tube 45a and an outer large diameter tube 45b. The inner peripheral surface of small diameter tube 45a is press fit onto the outer peripheral surface of connecting member 42. Left hub flange 46 comprises a radially extending flange member 46a and a stepped tubular member 46b. Flange member 46a is smaller in diameter than flange member 44, and a plurality of spoke engaging holes (not shown) are circumferentially formed along flange member 44a, circumferentially offset from the plurality of spoke engaging holes 44d in flange member 44, to engage the spokes of rear wheel 7. The inner peripheral surface of tubular member 46b is nonrotatably mounted onto the outer peripheral surface of large diameter tube 45b of left shell main member 45 using serrations or some other method. A threaded portion 46c is formed on the left side outer peripheral surface of tubular member 46b for the installation of rear brake device 9r.

As noted above, driven member 23 rotatably mounted around hub shaft 21 through first and second bearing assemblies 28 and 29. First bearing assembly 28 comprises a first bearing cup 28a mounted inside the left side of left hub flange 46, a first bearing cone 28b screwed onto threaded portion 21a of hub shaft 21, and a plurality of first ball bearings 28c disposed between first bearing cup 28a and first bearing cone 28b in predetermined positions by a conventional bearing retainer. First bearing cone 28b is locked in place by a lock nut 85 that is screwed onto threaded portion 21a of hub shaft 21, and first bearing cup 28a is press fit into the left end of connecting member 42. A seal 71 is mounted in the gap between first bearing cone 28b and left hub flange 46 to prevent contaminants from entering first bearing assembly 28. Similarly, second bearing assembly 29 comprises a second bearing cup 29a that is formed by the inner peripheral surface of right shell main member 43, a second bearing cone 29b that is press fit at a stepped portion of hub shaft 21, and a plurality of second ball bearings 29c disposed between second bearing cup 29a and second bearing cone 29b in predetermined positions by a conventional bearing retainer.

Figure 3:
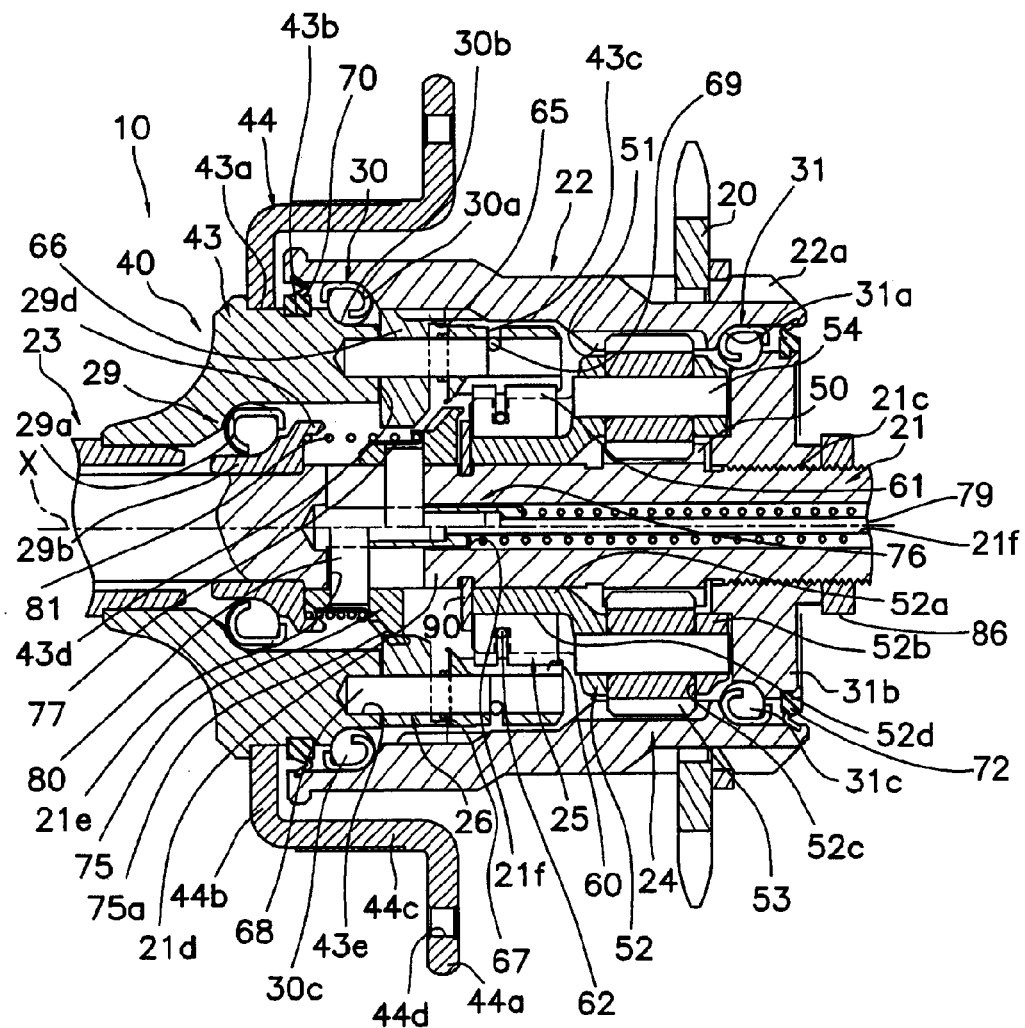
FIG. 3 is a more detailed view of the components mounted in close proximity to the drive member.

As shown in FIG. 3, sprocket 20 is mounted around the outer peripheral surface of drive member 22. More specifically, drive member 22 has a plurality of splines 22a for engaging a complementary plurality of splines on sprocket 20 to nonrotatably couple sprocket 20 to drive member 22. Drive member 22 is a stepped tube that transmits the rotation force from sprocket 20 to the remaining components. As noted above, drive member 22 is rotatably mounted around hub shaft 21 through third and fourth bearing assemblies 30 and 31.

Third bearing assembly 30 comprises a third bearing cup 30a formed by the left side inner peripheral surface of drive member 22, a third bearing cone 30b formed by the outer peripheral surface of right shell main member 43, and a plurality of third ball bearings 30c disposed between third bearing cup 30a and third bearing cone 30b in predetermined positions by a conventional bearing retainer. Seal 70 is mounted in the gap between the inner peripheral surface of drive member 22 and the outer peripheral surface of right shell main member 43 to prevent contaminants from entering third bearing assembly 30.

Similarly, fourth bearing assembly 31 comprises a fourth bearing cup 31a that is formed by the inner peripheral surface of drive member 22, a fourth bearing cone 31b that is screwed onto threaded portion 21c of hub shaft 21, and a plurality of fourth ball bearings 31c disposed between fourth bearing cup 31a and fourth bearing cone 31b in predetermined positions by a conventional bearing retainer. Fourth bearing cone 31b is locked in place by a lock nut 86 that is screwed onto threaded portion 21c. A seal 72 is mounted in the gap between the inner peripheral surface of drive member 22 and the outer peripheral surface of fourth bearing cone 31b to prevent contaminants from entering fourth bearing assembly 31.

Planetary gear mechanism 24 comprises sun gear 50 formed by hub shaft 21, an internal toothed ring gear 51 formed on in the inner peripheral surface of drive member 22, a planet gear carrier 52 rotatably supported around the large diameter portion 21d of hub shaft 21, and, e.g., four planet gears 53 rotatably supported by planet gear carrier 52. Planet gear carrier 52 comprises a smaller diameter tubular member 52a and a larger diameter tubular member 52b, wherein smaller diameter tubular member 52a is rotatably supported on hub shaft 21, and larger diameter tubular member 52b extends from the right side of smaller diameter tubular member 52a. Gear openings 52c are formed in larger diameter tubular member 52b for receiving planet gears 53 therein. Four pivot shafts 54 are mounted to larger diameter tubular member 52b, wherein each pivot shaft 54 rotatably supports one of the planet gears 53. Each planet gear 53 engages both sun gear 50 and ring gear 51. The right end of larger diameter tubular member 52b is rotatably supported on a stepped portion of fourth bearing cone 31b. Thus, tilting of planet gear carrier 52 or planet gears 53 is unlikely because planet gear carrier 52 is supported at its opposite ends by hub shaft 21 and fourth bearing cone 31b. A lock ring 90 mounted on hub shaft 21 limits axial movement of planet gear carrier 52.

In this embodiment, a diameter of the inner peripheral surface of second bearing cone 29b is smaller than a diameter of the innermost peripheral surface of planet gear carrier 52 that is installed on large diameter portion 21d of hub shaft 21. Furthermore, a diameter of a contact arc formed by contact between the plurality of second ball bearings 29c and second bearing cone 29b is greater than the diameter of the innermost peripheral surface of planet gear carrier 52. Since second bearing cone 29b and hub shaft 21 are made as separate members, second bearing cone 29 can be made with a larger diameter, even if sun gear 50 and hub shaft 21 are formed as one piece. As a result, the number of second ball bearings 29c can be increased. This, in turn, results in reduced pressure between the plurality of second ball bearings 29c, second bearing cone 29b and the second bearing cup 29a with increased bearing service life despite high loads.

First one-way clutch 25 is mounted at a depression 52d on planet gear carrier 52 for transmitting rotational force from planetary gear mechanism 24 to driven member 23 along the reduced speed transmission path. In this embodiment, first one-way clutch 25 is a ratchet and pawl type clutch, and it comprises a plurality of first ratchet teeth 60 formed on the inner peripheral surface of right shell main member 43 of driven member 23, a plurality of, e.g., two first clutch pawls 61 mounted in depression 52d for movement between engagement and disengagement positions with the plurality of first ratchet teeth 60, and a biasing mechanism in the form of a ring-shaped first spring 62 that biases each first clutch pawl 61 toward the engagement position. As a result, first one-way clutch 25 transmits rotational force from planet gear carrier 52 to driven member 23 in the advancing direction of planet gear carrier 52. However, when driven member 23 rotates in the advancing direction faster than planet gear carrier 52, or if planet gear carrier 52 moves in the reverse direction, then first clutch pawls 61 merely skip over the plurality of first ratchet teeth 60.

Second one-way clutch 26 is mounted in a cutout 43d in right shell main member 43 immediately to the right of third bearing 30 for transmitting rotational force from drive member 22 to driven member 23 along the direct drive transmission path. In this embodiment, second one-way clutch 26 also is a ratchet and pawl type clutch, and it comprises a plurality of second ratchet teeth 65 formed on the inner peripheral surface of drive member 22, a plurality of, e.g., two second clutch pawls 66 rotatably mounted on pivot shaft 68 for movement between engagement (operative) and disengagement (inoperative) positions with the plurality of second ratchet teeth 65, and a biasing mechanism in the form of a torsion type second spring 67 wound around pivot shaft 68 for biasing each second clutch pawl 66 toward the engagement position. As a result, second one-way clutch 26 transmits rotational force from drive member 22 to driven member 23 in the advancing direction of drive member 22. However, when driven member 23 rotates in the advancing direction faster than drive member 22, or if drive member 22 moves in the reverse direction, then second clutch pawls 66 merely skip over the plurality of second ratchet teeth 65.

Clutch control mechanism 27 selectively switches second one-way clutch 26 between the operative and inoperative states. Clutch control mechanism 27 comprises a tubular clutch cam 75 and a moving mechanism 76. Clutch cam 25 includes a disk-shaped cam surface 75a that switches second clutch pawl 66 between the engaged and disengaged positions, and moving mechanism 76 moves clutch cam 75 axially along hub shaft 21 between an engagement position (shown by the lower half of FIG. 3 below the hub centerline X) and a disengagement position (shown by the upper half of FIG. 3 above the hub centerline X). Moving mechanism 76 comprises a spring receiver 77 disposed on the outer peripheral surface of clutch cam 75, a return spring 81 mounted between spring receiver 77 and protrusions 29d on second bearing cone 29b for biasing clutch cam 75 to the disengagement position, a rod-shaped key member 80 that extends through groove 21e in hub shaft 21 and locks into clutch cam 75, and a push rod 79 slidably mounted in push rod accommodating hole 21f in hub shaft 21. As shown in FIG. 2, push rod 79 comprises a rod-shaped pressure-receiving member 79a that is pushed by bell crank 11, a shaft member 79b that is screwed into the left side of pressure-receiving member 79a, and a pushing member 79c that pushes key member 80. A compressed coil spring 79b is disposed between pressure receiving member 79a and pushing member 79c. Push rod 79 moves toward the left in FIG. 3 when it is pushed by bell crank 11, thereby pushing key member 80 and clutch cam 75 into the engagement position. When bell crank 11 retreats to the right, clutch cam 75, key member 80 and push rod 79 move to the disengagement position in accordance with the biasing force of return spring 81.

To assemble internal hub transmission 10, planet gears 53 are mounted to planet gear carrier 52 through pivot shafts 54, then planet gear carrier 52 is installed from the left side of hub shaft 21 onto fourth bearing cone 31b, and lock ring 90 is attached to hub shaft 21 to retain planet gear carrier 52 to hub shaft 21. Clutch cam 75 is installed from the left side of hub shaft 21, key member 80 is inserted through groove 21e in hub shaft and into clutch cam 75, spring receiver member 77 is attached to clutch cam 75, return spring 81 is fitted to spring receiver member 77, and then second bearing cone 29b is press fit to hub shaft 21. First one-way clutch 25 is assembled to planet gear carrier 52, and second one-way clutch 26 is assembled to right shell main member 43. Finally, drive member 22, driven member 23, the remaining components of moving mechanism 76, and the remaining bearing assemblies are installed to complete the assembly.

When bell crank 11 is in the retracted position, clutch cam 75 is in the disengagement position and second clutch pawls 66 of second one-way clutch 26 engage corresponding second ratchet teeth 65. In this case, rotational power is communicated from drive member 22 through second one-way clutch 26 directly to driven member 23 to provide the direct drive transmission path.

When speed changing lever 8 is operated so that bell crank 11 pushes push rod 79 to the left, then clutch cam 75 moves to the engagement position, and second clutch pawls 66 rotate to disengage from the plurality of second ratchet teeth 65. In this case, rotational power is communicated from drive member 22 to ring gear 51, through planet gears 53, though planet gear carrier 52, through first one-way clutch 25 and to driven member 23 to provide the reduced speed transmission path.

The following equation expresses the gear reduction (GR) in the reduced transmission path:

$$GR = 1/(1+(Zs/Zr))$$

Here, only Zr (the number of teeth in ring gear 51), and Zs (the number of teeth in sun gear 50) determine the gear ratio GR. For example, if the number of teeth Zs in sun gear 50 is 15 T and the number of teeth Zr in ring gear 51 is 46 T, then $$GR = 1/(1+(15/46)) = 0.754$$

Figure 4:
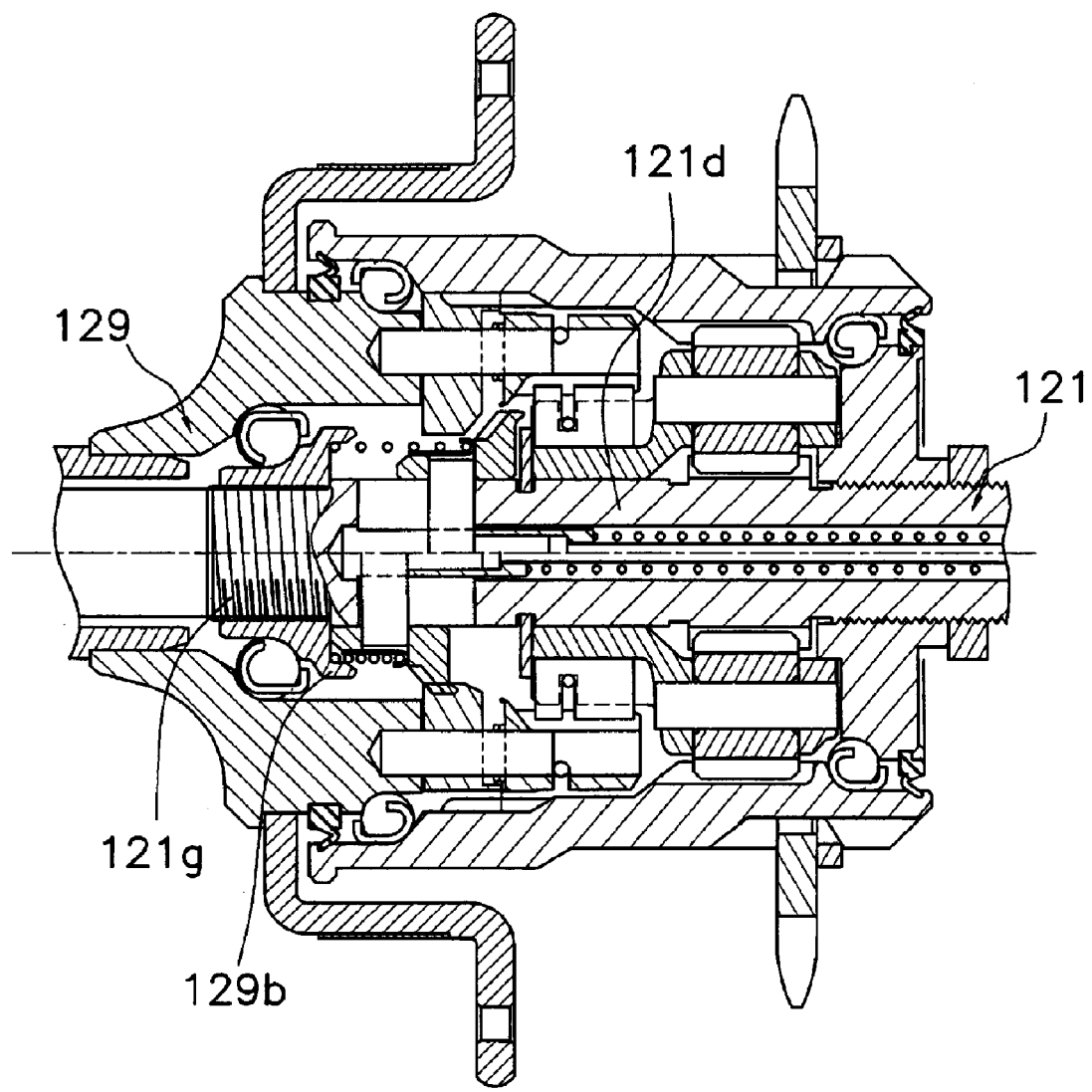
FIG. 4 is a detailed view of another embodiment of components mounted in close proximity to the drive member.

While the above is a description of various embodiments of inventive features, further modifications may be employed without departing from the spirit and scope of the present invention. For example, while second bearing cone 29b was press fit onto hub shaft 21, a second bearing cone 129b of a second bearing assembly 129 shown in FIG. 4 may be screwed onto a threaded portion 121g adjacent to a large diameter portion 121d of a hub shaft 121. The other components may be the same as the first embodiment.

Although internal transmission hub 10 was operated by a speed changing lever 8, many methods may be used to operate internal transmission hub 10, including centrifugal force. The number of available speeds (e.g., three or more) can be changed depending upon the application.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An internal hub transmission for a bicycle comprising:
    a hub shaft structured to be mounted to a bicycle frame;
    a drive member;
    a driven member;
    a planetary gear mechanism that communicates rotational force from the drive member to the driven member, wherein the planetary gear mechanism comprises:
        a sun gear integrally formed with the hub shaft;
        a planet gear carrier rotatably supported relative to the hub shaft;
        a planet gear rotatably supported by the planet gear carrier, wherein the planet gear engages the sun gear; and
        a ring gear that engages the planet gear;
    a first bearing assembly comprising:
        a separate first bearing cone mounted to the hub shaft;
        a first bearing cup; and
        a plurality of first bearing members disposed between the first bearing cone and the first bearing cup;
    a second bearing assembly comprising:
        a separate second bearing cone that is a separate member from the hub shaft and is mounted to the hub shaft axially spaced apart inwardly from the first bearing cone;
        a second bearing cup; and
        a plurality of second bearing members disposed between the second bearing cone and the second bearing cup;
    a third bearing assembly that rotatably supports the drive member relative to the hub shaft; and
    a fourth bearing assembly that rotatably supports the drive member relative to the hub shaft.

2. The transmission according to claim 1 wherein the first bearing cone is screwed to the hub shaft, and wherein the second bearing cone is press fit to the hub shaft.

3. The transmission according to claim 1 wherein the first bearing cone is screwed to the hub shaft, and wherein the second bearing cone is screwed to the hub shaft.

4. The transmission according to claim 1 wherein an inner diameter of the second bearing cone is less than an innermost diameter of the planet gear carrier.

5. The transmission according to claim 1 wherein a diameter of a contact arc between the second bearing cone and the plurality of second bearing members is greater than an innermost diameter of the planet gear carrier.

6. The transmission according to claim 1 wherein an inner diameter of the second bearing cone is less than an innermost diameter of the planet gear carrier, and wherein a diameter of a contact arc between the second bearing cone and the plurality of second bearing members is greater than an innermost diameter of the planet gear carrier.

7. The transmission according to claim 1 wherein the driven member radially overlaps the drive member.

8. The transmission according to claim 1 wherein an inner peripheral surface of the drive member forms the ring gear.

9. The transmission according to claim 1 wherein the driven member radially overlaps the drive member, and wherein an inner peripheral surface of the drive member forms the ring gear.

10. The transmission according to claim 1 wherein the third bearing assembly comprises a third bearing cone is disposed on the driven member.

11. The transmission according to claim 10 wherein the fourth bearing assembly comprises a fourth bearing cone detachably mounted to the hub shaft.

12. The transmission according to claim 11 wherein the third bearing assembly further comprises a third bearing cup disposed on the drive member.

13. The transmission according to claim 12 wherein the fourth bearing assembly further comprises a fourth bearing cup disposed on the drive member.

14. The transmission according to claim 1 further comprising a one-way clutch that communicates rotational force between the planet gear carrier and the driven member.

15. The transmission according to claim 1 further comprising a one-way clutch that communicates rotational force between the drive member and the driven member.

16. The transmission according to claim 1 further comprising:
    a first one-way clutch that communicates rotational force between the planet gear carrier and the driven member; and a second one-way clutch that communicates rotational force between the drive member and the driven member.

17. The transmission according to claim 16 further comprising a clutch control mechanism that controls the operation of the second one-way clutch mechanism.

18. The transmission according to claim 17 wherein the clutch control mechanism comprises an axially moving push rod.

19. The transmission according to claim 18 wherein the second one-way clutch comprises a pawl that selectively engages a ratchet tooth to communicate rotational force between the drive member and the driven member.

20. The transmission according to claim 19 wherein the clutch control mechanism further comprises a clutch cam operated by the push rod to engage and disengage the pawl from the ratchet tooth.

21. The transmission according to claim 19 further comprising a biasing mechanism that biases the pawl toward engagement with the ratchet tooth.

22. The transmission according to claim 1 further comprising:
   a first seal that prevents contaminants from entering the first bearing assembly;
   a second seal that prevents contaminants from entering the third bearing assembly; and
   a third seal that prevents contaminants from entering the fourth bearing assembly.

23. The transmission according to claim 1 wherein the second bearing cone is disposed between the first bearing cone and at least one of the third bearing assembly or the fourth bearing assembly.

* * * * *